United States Patent [19]
Brown et al.

[11] Patent Number: 5,225,842
[45] Date of Patent: Jul. 6, 1993

[54] VEHICLE TRACKING SYSTEM EMPLOYING GLOBAL POSITIONING SYSTEM (GPS) SATELLITES

[75] Inventors: Alison K. Brown, Monument, Colo.; Mark A. Sturza, Woodland Hills, Calif.

[73] Assignee: NAVSYS Corporation, Monument, Colo.

[21] Appl. No.: 697,754

[22] Filed: May 9, 1991

[51] Int. Cl.[5] .......................... H04B 7/185; G01S 5/02
[52] U.S. Cl. .................................................. 342/357
[58] Field of Search ............... 342/457, 357, 352, 356; 364/449

[56] References Cited
U.S. PATENT DOCUMENTS 4,894,662  1/1990  Counselman ........................ 342/357
4,928,106  5/1990  Ashjaee et al. ..................... 342/352
4,949,268  8/1990  Nishikawa et al. ................. 342/357

Primary Examiner—Theodore M. Blum
Attorney, Agent, or Firm—William E. Hein

[57] ABSTRACT

A tracking system employing global positioning system (GPS) satellites provides extremely accurate position, velocity, and time information for vehicles or any other animate or inanimate object within any mobile radio communication system or information system, including those operating in high rise urban areas. The tracking system includes a sensor mounted on each object, a communication link, a workstation, and a GPS reference receiver. The sensor operates autonomously following initialization by an external network management facility to sequence through the visible GPS satellites, making pseudo range and delta range or time difference and frequency difference measurements. No navigation functions are performed by the sensor, thereby permitting significant reductions in the cost thereof. The raw satellite measurements, with relevant timing and status information, are provided to the communication link to be relayed periodically back to the workstation. Differential corrections may also be provided at the workstation to increase the accuracy of the object location determination. In normal operation, three satellite measurements are required to compute the location of the object, but for a short time period a minimum of two satellite measurements are acceptable with time, altitude, and map aiding information being provided by the workstation.

32 Claims, 5 Drawing Sheets

VEHICLE TRACKING SYSTEM EMPLOYING GLOBAL POSITIONING SYSTEM (GPS) SATELLITES

BACKGROUND AND SUMMARY OF THE INVENTION

This invention relates generally to navigation systems and more specifically to a system for tracking vehicles and other objects on or near the earth's surface using satellites of the Global Positioning System (GPS). The GPS is a multiple-satellite based radio positioning system in which each GPS satellite transmits data that allows a user to precisely measure the distance from selected ones of the GPS satellites to his antenna and to thereafter compute position, velocity, and time parameters to a high degree of accuracy, using known triangulation techniques. The signals provided by the GPS can be received both globally and continuously. The GPS comprises three major segments, known as the space, control, and user segments.

The space segment, when fully operational, will consist of twenty-one operational satellites and three spares. These satellites will be positioned in a constellation such that typically seven, but a minimum of four, satellites will be observable by a user anywhere on or near the earth's surface. Each satellite transmits signals on two frequencies known as L1 (1575.42 MHz) and L2 (1227.6 MHz), using spread spectrum techniques that employ two types of spreading functions. C/A and P pseudo random noise (PRN) codes are transmitted on frequency L1, and P code only is transmitted on frequency L2. The C/A or coarse/acquisition code, is available to any user, military or civilian, but the P code is only available to authorized military and civilian users. Both P and C/A codes contain data that enable a receiver to determine the range between a satellite and the user. Superimposed on both the P and C/A codes is the navigation (Nav) message. The Nav message contains 1) GPS system time; 2) a handover word used in connection with the transition from C/A code to P code tracking; 3) ephemeris data for the particular satellites being tracked; 4) almanac data for all of the satellites in the constellation, including information regarding satellite health, coefficients for the ionospheric delay model for C/A code users, and coefficients used to calculate universal coordinated time (UTC).

The control segment comprises a master control station (MCS) and a number of monitor stations. The monitor stations passively track all GPS satellites in view, collecting ranging data and satellite clock data from each satellite. This information is passed on to the MCS where the satellites' future ephemeris and clock drift are predicted. Updated ephemeris and clock data are uploaded to each satellite for re-transmission in each satellite's navigation message. The purpose of the control segment is to ensure that the information transmitted from the satellites is as accurate as possible.

GPS is intended to be used in a wide variety of applications, including space, air, sea, and land vehicle navigation, precise positioning, time transfer, attitude reference, surveying, etc. GPS will be used by a variety of civilian and military organizations all over the world. A number of prior art GPS receivers have been developed to meet the needs of the diverse group of users. These prior art GPS receivers are of a number of different types, including sequential tracking, continuous reception, multiplex, all in view, time transfer, and surveying receivers.

A GPS receiver comprises a number of subsystems, including an antenna assembly, an RF assembly, and a GPS processor assembly. The antenna assembly receives the L-band GPS signal and amplifies it prior to insertion into the RF assembly. A significant factor affecting the accuracy of the computed position, velocity or time parameters is the positional geometry of the satellites selected for measurement of ranges. Generally, the best position solution is obtained using satellites having wide angles of separation. Considerable emphasis has therefore been placed on designing antenna systems to receive, with uniform gain, signals from any point on the hemisphere. This design approach tends to result in an expensive antenna assembly.

The RF assembly mixes the L-band GPS signal down to a convenient IF frequency. Using various known techniques, the PRN code modulating the L-band signal is tracked through code-correlation to measure the time of transmission of the signals from the satellite. The doppler shift of the received L-band signal is also measured through a carrier tracking loop. The code correlation and carrier tracking function can be performed using either analog or digital processing.

The control of the code and carrier tracking loops is provided by the GPS processor assembly. By differencing this measurement with the time of reception, as determined by the receiver's clock, the pseudo range between the receiver and the satellite being tracked may be determined. This pseudo range includes both the range to the satellite and the offset of the receiver's clock from the GPS master time reference. The pseudo range measurements and navigation data from four satellites are used to compute a three dimensional position and velocity fix, to calibrate the receiver's clock offset, and to provide an indication of GPS time.

In some known receivers, the receiver processor controller (RPC) functions are performed using a computer separate from that on which the navigation functions are performed. In other known receivers, both types of functions are performed by a single computer. The RPC processing and memory functions that a typical GPS receiver performs include monitoring channel status and control, signal acquisition and reacquisition, code and carrier tracking loops, computing pseudo range (PR) and delta range (DR) measurements, determining data edge timing, acquisition and storage of almanac and ephemeris data broadcast by the satellites, processor control and timing, address and command decoding, timed interrupt generation, interrupt acknowledgment control, and GPS timing, for example. These functions are fixed point operations and do not require a floating point coprocessor.

The navigation processing and memory functions performed by a typical GPS receiver include satellite orbit calculations and satellite selection, atmospheric delay correction calculations, navigation solution computation, clock bias and rate estimates, computation of output information, and preprocessing and coordinate conversion of aiding information, for example. These functions require significant amounts of processing and memory and are generally performed using a floating point coprocessor.

The GPS standard positioning service provides a navigation accuracy of 100 m 2dRMS. A number of applications of the GPS require higher levels of accuracy. Accuracy can be improved using a technique known as differential GPS (DGPS). This technique involves operating a GPS receiver in a known location. The receiver is used to compute satellite pseudo range correction data using prior knowledge of the correct satellite pseudo ranges, which are then broadcast to users in the same geographic area. The pseudo range corrections are incorporated into the navigation solution of another GPS receiver to correct the observed satellite pseudo range measurements, thereby improving the accuracy of the position determination. Correlation of the errors experienced at the reference station and at the user location is dependent on the distance between them, but they are normally highly correlated for a user within 350 kilometers of the reference station.

An alternative to the GPS receiver known in the prior art is the GPS translator, which includes only the antenna assembly and RF assembly portions of a GPS receiver. Translators are typically employed in missile tracking applications where small, lightweight, expendable sensors are required. The GPS C/A code spread spectrum signals received by the translator are combined with a pilot carrier and transmitted at S-band frequencies (2200 to 2400 MHz). A GPS translator processor located at the telemetry tracking site receives these translated GPS C/A code signals and estimates the position and velocity of the vehicle.

Known variants of the GPS translator are the digital translator and the transdigitizer. A vehicle-borne GPS digital translator or transdigitizer operates to convert the GPS C/A code spread spectrum signals to base band and perform in-phase and quadrature phase sampling at a rate of about 2 MHz. Transdigitized GPS signals in a ground based translator processing system are processed much like GPS signals.

In summary, prior art GPS receivers may be one of two types. In the first type, all navigation processing activities occur at the receiver, which outputs the vehicle position and velocity using either a single computer or an RPC and navigation computer, in which there is substantial interconnection between the RPC functions and the navigation functions for satellite selection and acquisition. In the second type of GPS receiver, the GPS signal is remoted by translation or variations thereof and the signal is tracked at a ground processing facility where the vehicle position and velocity are derived. In accordance with this latter approach, significant bandwidth is required to transmit the translated signal.

It is therefore the principal object of the present invention to provide a low cost tracking system for vehicles and other objects, using GPS satellites, that is capable of tracking several hundred vehicles or platforms using a low bandwidth data link.

It is a further object of the present invention to provide a low cost vehicle tracking system, using GPS satellites, that has the ability to function accurately in high rise urban areas by employing an antenna system optimized for high elevation satellites and by employing mapping aiding functions in a VLS workstation to reduce the number of satellites that the system is required to receive for short periods of time.

These and other objects are accomplished in accordance with the illustrated preferred embodiment of the present invention by providing a GPS sensor module that supplies the data required to locate a particular vehicle, a two-way vehicle location system (VLS) communication link, and a VLS workstation to process the data and display the vehicle location. The GPS sensor module comprises an antenna and a sensor. The sensor operates autonomously following initialization by the network management facility. The sensor sequences through the visible GPS satellites, making pseudo range (PR) and delta range (DR) or time difference (TD) and frequency difference (FD) measurements. No navigation functions are performed by the sensor, thereby permitting significant reductions in the cost thereof. The raw satellite measurements, with relevant timing and status information, are provided to the VLS communication link to be relayed periodically back to the VLS workstation. Using this set of raw satellite measurements, the location of the sensor can be determined to a precision of 100 meters. If differential corrections are also provided at the VLS workstation, the accuracy of the vehicle location determination can be improved to better than 10 meters. In normal operation, three satellite measurements are required to compute the location of the vehicle, but for a short time period a minimum of two satellite measurements are acceptable with time, altitude, and map aiding information being provided from the VLS workstation. The principal advantage afforded by the present invention is its ability to provide extremely accurate position, velocity, and time information for vehicles, including those in high rise urban areas, using a low cost vehicle sensor and any mobile radio communication system or information system. By eliminating the navigation functions performed in prior art GPS sensors, a low cost computer may be used, thereby providing a significant cost reduction over existing GPS receiver designs.

DETAILED DESCRIPTION OF THE INVENTION

The present invention is directed to an apparatus and method for computing the position and velocity of multiple low cost vehicle-mounted sensors, monitored and tracked by a central control station. In the present invention, the receiver processor functions are physically separated from the navigation functions, and a low rate data interface is provided between the computers that perform these functions. This separation of receiver processor and navigation functions results in a significant cost saving in the GPS sensor that is employed on board each vehicle. The GPS sensor provides GPS satellite measurements on a periodic basis through a conventional bandwidth radio communication link to a master station. The GPS sensor data is transmitted on a periodic basis at low data rates, thereby permitting the use of conventional transmission paths capable of handling data at the rate of 300 bits/second. Thus, data can be transmitted from large numbers of vehicles using conventional radio facilities. The master station computes the vehicle position for all users of the system, and large numbers of vehicle solutions can be processed simultaneously by the master station by exploiting the commonality in satellite geometry for all sensors tracking the same satellites in a common area having a radius on the order of 100 kilometers. The master station down loads initialization data such as initial position estimates or a satellite selection table to each sensor on a periodic daily or monthly basis over a conventional radio communication link. The differential GPS accuracy is achieved for each sensor by use of a reference GPS receiver located at the master station. The use of altitude, map, and time aiding at the master station reduces some of the satellite geometry requirements, thereby permitting the use of high elevation satellites only as a way to simplify satellite acquisition, increase service availability, and reduce the cost of the antenna system.

Figure 1:
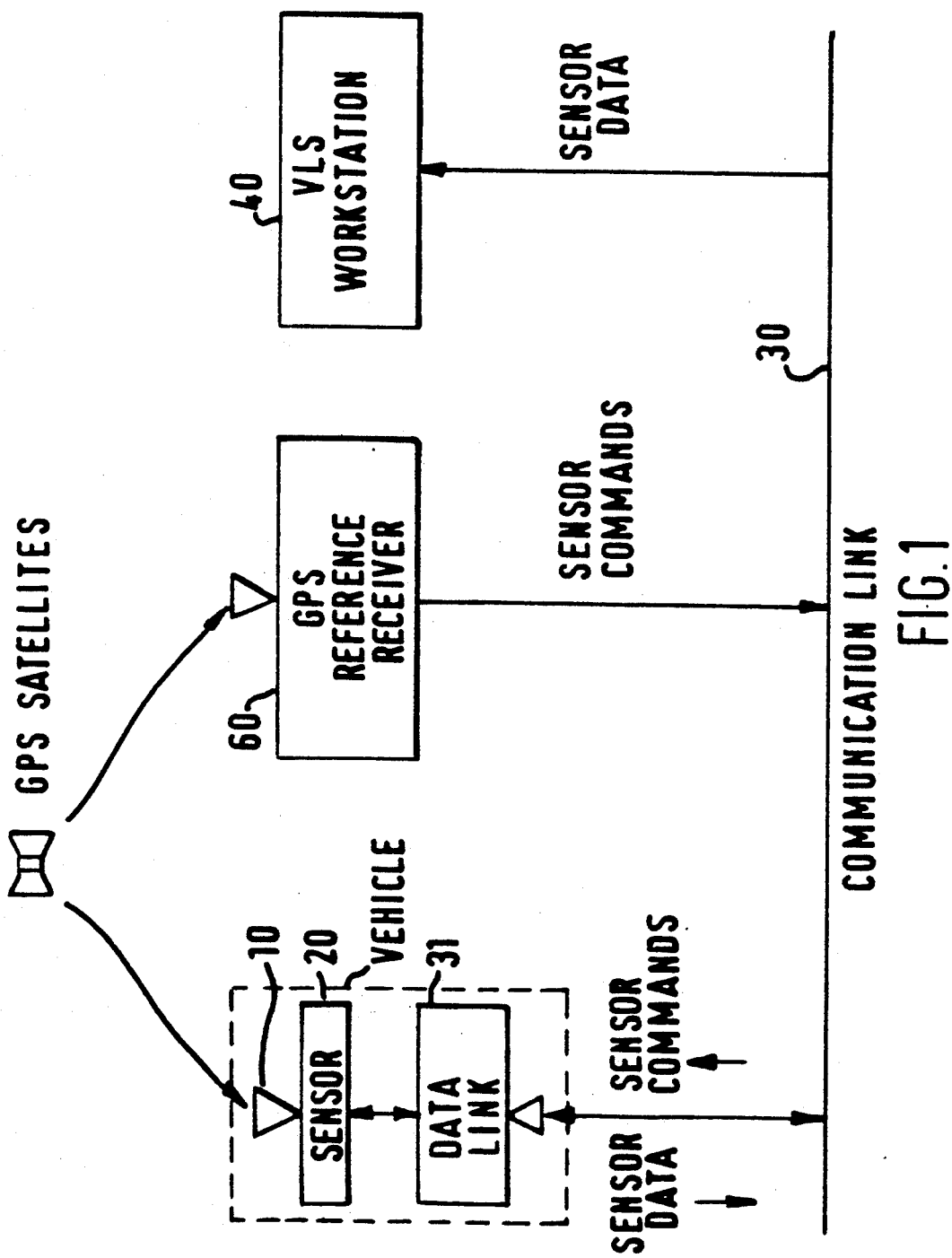
FIG. 1 is a block diagram illustrating the primary components of the GPS vehicle tracking system of the present invention.

Referring now to the block diagram of FIG. 1, the vehicle tracking system of the present invention primarily comprises an antenna 10, a sensor 20, a communication link 30, a VLS workstation 40, and a GPS reference receiver 60.

Antenna 10 may comprise any of a number of commercially available low-gain, low-cost antennas, the use of which is made possible as the result of only requiring high elevation satellites in the system implementation. This also simplifies satellite acquisition and permits operation of the vehicle tracking system in high rise urban areas.

Figure 2:
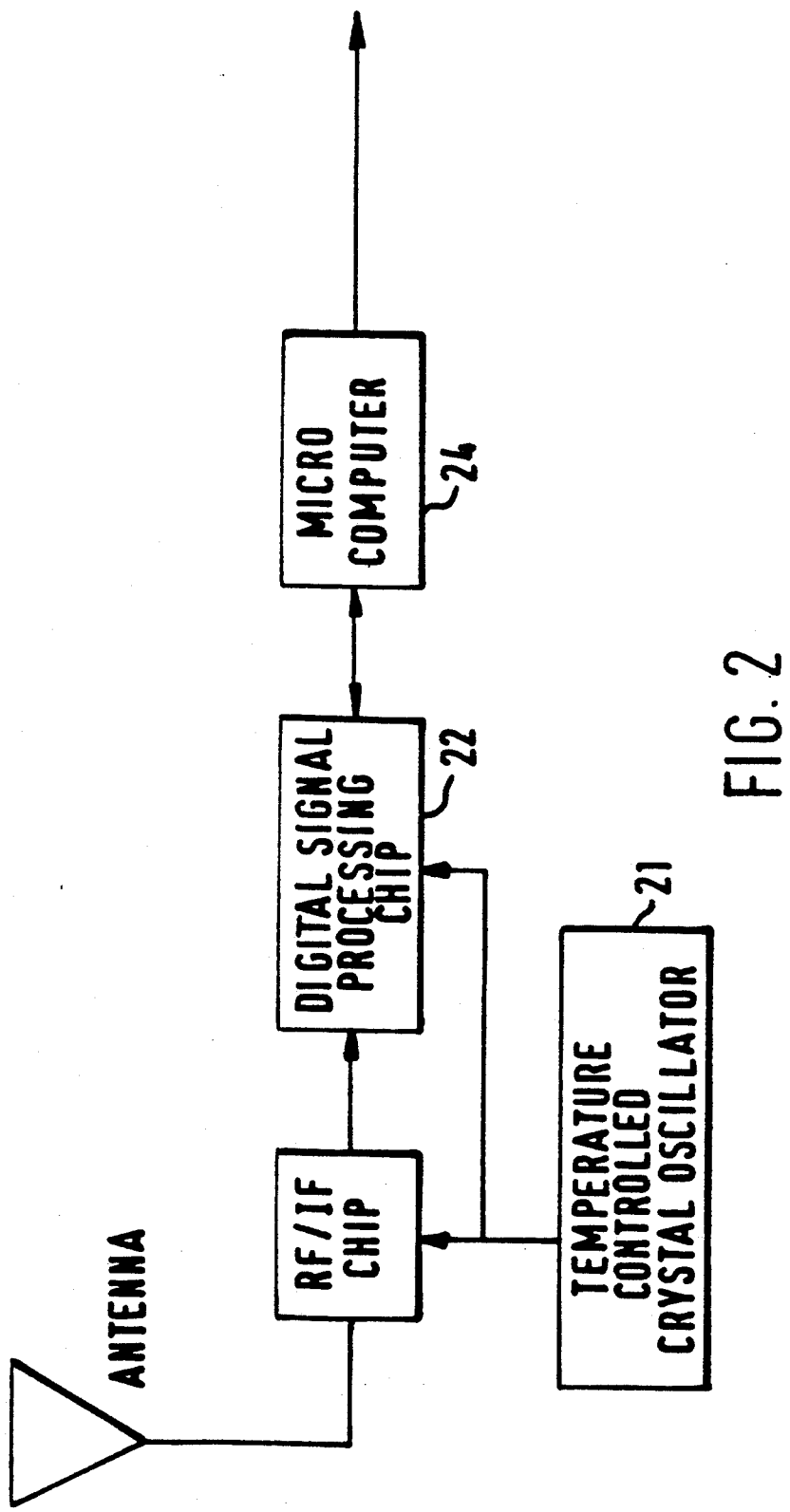
FIG. 2 is block diagram of the sensor employed in the GPS vehicle tracking system of FIG. 1.
Figure 3:
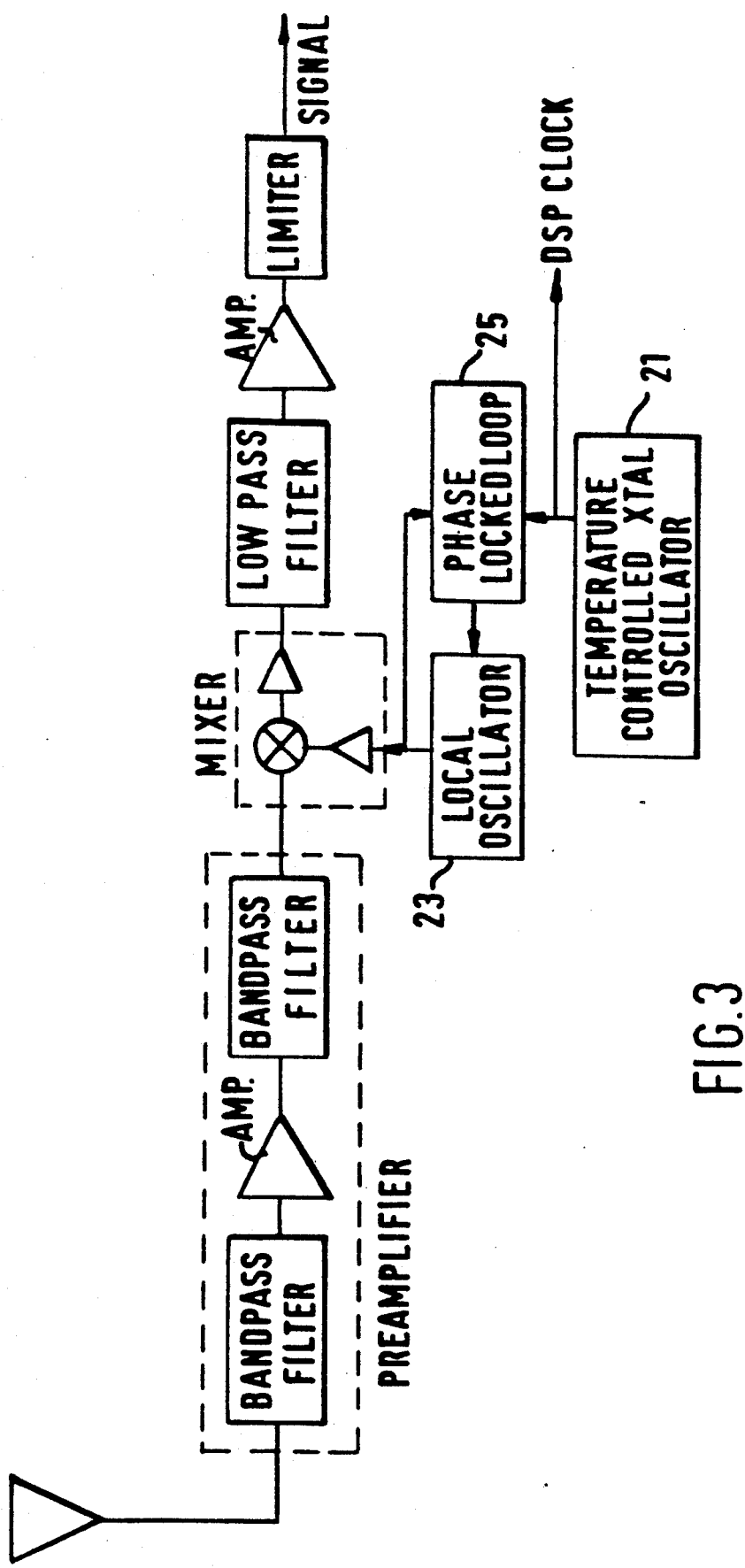
FIG. 3 is a block diagram of the RF/IF section of the sensor of FIG. 2.
Figure 4:
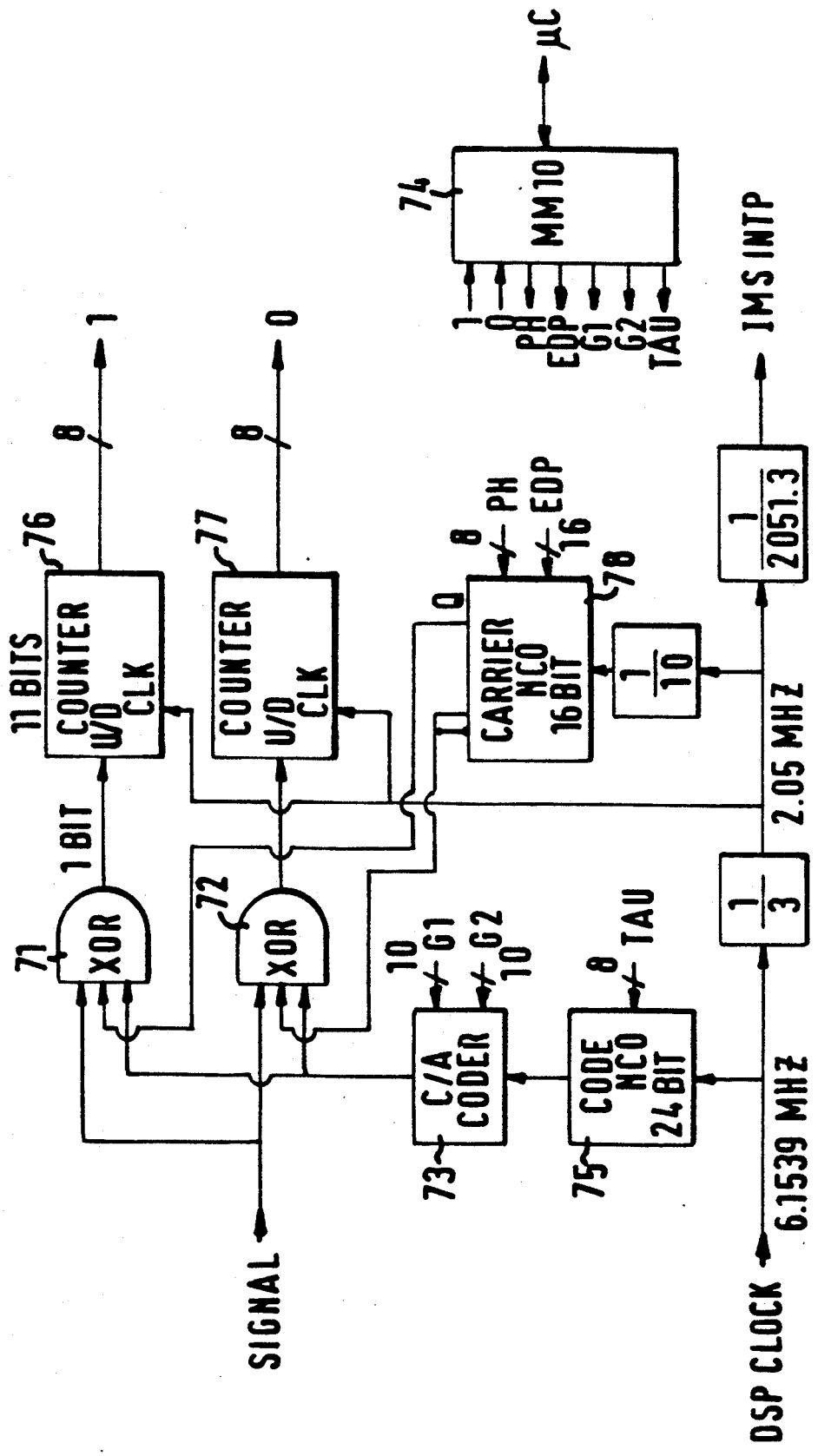
FIG. 4 is a block diagram of the digital signal processor chip (DSP) of the sensor of FIG. 2.

A representative implementation of sensor 20 employs a simplified method of frequency synthesis, a temperature compensated crystal oscillator (TCXO) 21 or other low cost oscillator, a simplified digital signal processor (DSP) 22, and reduced computational processing. Detailed block diagrams of sensor 20 are shown in FIGS. 2 and 3. Frequency synthesis within sensor 20 is based on an oscillator frequency (F0) of 6.1539 MHz that is produced by temperature compensated crystal oscillator 21. A local oscillator frequency (L0), produced by local oscillator 23, is $256 \times F0 = 1575.3984$ MHz. The power of 2 multiplier (256) simplifies the design of a phase lock loop (PLL) 25 that is employed to lock the frequency of the local oscillator 23 to that of the crystal oscillator 21. The resulting intermediate frequency (IF) is 1575.42 MHz$-256$ F0$=21.6$ KHz. This IF is far enough above DC to allow distinction between positive and negative doppler shifts. It is also close enough to DC to result in minimal post correlation noise increase due to spectral noise folding. The sampling clock used by the DSP chip 22 is F0/3$=2.01513$ MHz, a frequency that is ideal in that it is not related to the 1.023 MBS chip rate. A conventional microcomputer 24 is used that requires only fixed point operation. Sensor 20 may be configured with from one to eight DSP channels 22, depending on the particular application. Each of DSP channels 22, the details of which are illustrated in FIG. 4, comprises a custom gate array that performs the C/A code correlation and removes the L-band signal doppler shift on the digital GPS signals. The residual in-phase (I) and quadrature (Q) signals are accumulated over 1 millisecond for early, late, and prompt code phase and are provided to a microcomputer for signal tracking. The tracking microcomputer is used to select the GPS satellite to be tracked and to close the code and carrier tracking loops.

Microcomputer 24 of sensor 20 may comprise any of a number of commercially available microcomputers, depending on the application and system requirements. A minimum system configuration requires a Z80 microcomputer or equivalent to perform signal tracking and to control the operation of sensor 20. Other applications that involve multichannel processing and high performance navigation may require a more powerful microcomputer that may comprise an existing host system microcomputer, if appropriate.

The details of operation of the digital signal processing chip 22 of FIG. 2 may be understood with reference to the detailed block diagram of FIG. 4. A pair of exclusive OR gates 71 and 72 serve to perform code correlation on the input signal and also to perform carrier demodulation to generate the in phase and quadrature signals I and Q. A pair of up/down counters 76 and 77 serve to accumulate the in phase and quadrature signals I and Q. A C/A coder 73 generates coarse acquisition code from input signals G1 and G2. G1 is a 10-bit signal received from a memory map interface 74 that determines which satellite is being tracked. Memory map interface 74 is coupled to micro computer 24 of FIG. 2 and generates a number of signals from the in phase and quadrature input signals I and Q. A code phase numerically controlled oscillator (NCO) 75 receives a signal TAU from memory map interface 74 that serves to increment code phase NCO 75 to, in turn, index C/A coder 73. A carrier NCO 78 is initialized by phase PH and estimate delta phase EDP signals received from memory map interface 74 and, in turn, generates the in phase I and quadrature Q signals used to perform carrier demodulation. Carrier NCO 78 is clocked by a signal that is 1/30 of the frequency of a DSP clock signal. A 1 ms. interrupt signal INTP is derived from the DSP clock signal and serves to signal micro computer 24 that data is available.

Data and commands are transferred between sensor 20 and communication link 30 via a conventional data link 31 capable of handling a data rate of 300 bits per second. Exemplary of the conventional communication links that may be employed for this purpose are two-way paging systems, private mobile radio, citizens band radio, cellular radio, personal communications systems, trunked mobile radio systems, local area mobile radio systems, and military communications systems.

VLS workstation 40 operates to receive the GPS sensor data through communication link 30 and to compute the vehicle (sensor 20) location. The location is then displayed to the customer superimposed on a map of the region. VLS workstation 40 also serves as a communications interface by receiving data from sensor 20, identifying the vehicle being tracked, and passing the appropriate data to the navigation function for processing. In addition, VLS workstation 40 serves to control sensor 20 by transmitting initialization data to sensor 20 and by requesting status data therefrom. The initialization data may comprise a reporting interval, satellite selection, and current position information. VLS workstation 40 may also serve to compute the position of the GPS satellites using data from a reference receiver 60. Optionally, VLS workstation 40 may be employed to derive a DGPS correction factor for the satellite measurements. It also computes the SV position to provide an estimated PR or TD measurement to the median location for each GPS satellite visible from the area of operation. VLS workstation 40 computes an observation matrix for a median location in the area of operation. This matrix may be derived from the line of sight vectors to each satellite. A navigation algorithm is employed to compute the measurement residuals from the data received from each of the vehicle sensors 20 and the SV correction data. These measurement residuals are processed by VLS workstation 40 using the data from the observation matrix computation to derive the vehicle offset from a median location. Using this approach, accurate vehicle positions may be calculated over a 100-kilometer area using the navigation algorithm. An aided navigation solution may be computed by VLS workstation 40 for sensors 20 that report data from less than four satellites. The vehicle altitude may then be estimated from a digital map and used to compute a solution using only three satellites. Information regarding direction of travel may be included to estimate a solution for a short period of time during which data from fewer than three satellites is provided. Finally, VLS workstation 40 is operative for visually displaying the locations of the vehicles on which sensors 20 are positioned to the user. Hard copy reports that provide this information may also be generated, and this information may also be integrated with conventional routing software, for example.

Figure 5:
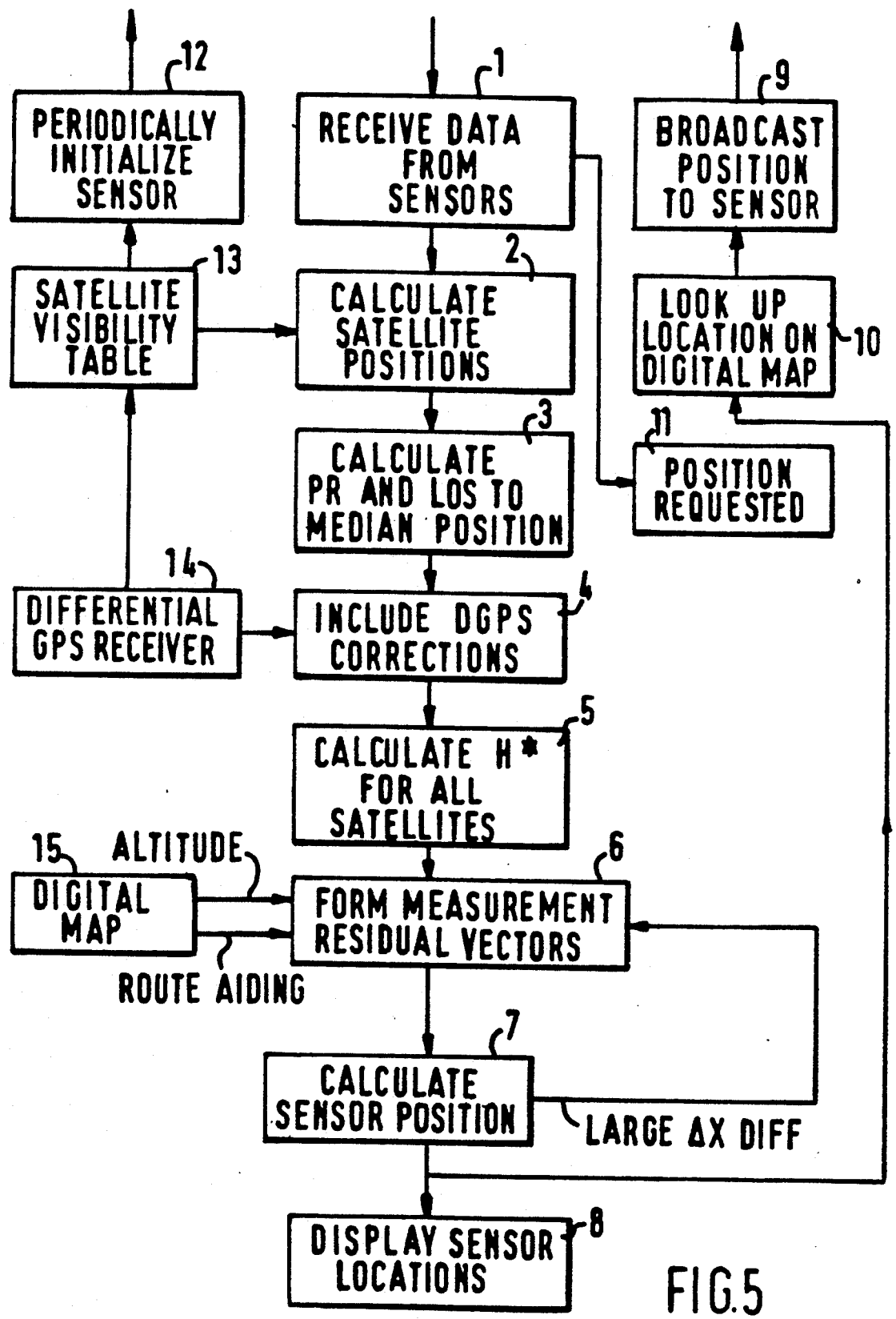
FIG. 5 is a flow chart of the process employed to determine vehicle position using the GPS vehicle tracking system of FIG. 1.

Referring now to the system block diagram of FIG. 1 and to the flow chart of FIG. 5, data from sensor 20 is first retrieved from the communication link 30 and stored in memory. At steps 2, 13, and 14, the satellite position is computed for each satellite in view of the region of coverage as determined from the satellite visibility table derived on a periodic (hourly, for example) basis from reference receiver 60. At step 3, the satellite positions and clock calibration coefficients are used to compute the estimated pseudo range (range and clock bias) to the median location. The line-of-sight vectors are also determined to this location. At step 4, differential GPS corrections received from GPS reference receiver 60 are added to the estimated pseudo range to correct for atmospheric effects and errors in the satellite position and clock offsets. At step 5, the line-of-sight vectors determined at step 3 are used to compute a least squares transformation matrix H* for all sets of satellites tracked by the sensors 20 in the region covered. The measurement residual vectors are then computed at step 6 by differencing the received measurements from the estimated measurements derived at step 4. The estimated altitude offset of the vehicle from the median location is also included as a measurement residual. In cases where fewer than three satellite measurements are available, data aiding from a knowledge of the vehicle route (direction of travel) derived from the digital map 15 may also be included. In order to compute the location of each of sensors 20 at step 7, the measurement residual vectors derived at step 6 are then multiplied by the appropriate transformation matrix H* derived at step 5 to calculate the offset from the median location. If the location derived does not correspond with a possible solution (i.e. does not lie in a valid region of the digital map 15), the location is recomputed using an updated altitude offset and route aiding from the digital map 15. At step 8, the locations of sensors 20 are displayed to the operator, overlayed on a map of the region. Optionally, at step 9, the position of each of sensors 20 may also be rebroadcast back to a particular sensor through the communication link 30 if requested at step 11. The position information may be in terms of an offset coordinate or as a street location derived, at step 10, from the digital map. At step 12, VLS workstation 70 periodically updates the sensors 20 with initialization data on satellites to be tracked using information derived from the visibility table.

While the preferred embodiment of the GPS tracking system of the present invention has been described above in connection with ground-based vehicles, it should be understood that the tracking system of the present invention may be employed to track sea-based (both surface and underwater) and air-based vehicles (e.g. balloons, conventional aircraft, and satellites), as well as personnel, and even animals, for example.

We claim:

1. A tracking system employing global positioning system (GPS) satellites for determining the position of one or more objects to be tracked, the tracking system comprising:

sensor means, mounted on each object, the sensor means being operative for receiving signals provided by a plurality of visible GPS satellites and for computing sensor data comprising selected raw satellites measurements;

workstation means, positioned at a central location that is remotely located with respect to said one or more objects, for periodically receiving and storing the raw satellite measurements computed by said sensor means, for computing therefrom position information relative to the one or more objects, and for displaying the computed position information to an operator at said central location, said workstation means being further operative for periodically providing initialization data in the form of sensor commands to said sensor means to enable said sensor means to acquire and track the plurality of visible GPS satellites, said workstation means being operative for storing a digital map containing route and altitude aiding information regarding each of the one or more objects, thereby facilitating computation of said position information using only high elevation satellites and when the one or more objects are operating in a high rise urban environment; and a communication link coupling said sensor means and said workstation means to facilitate the transfer of sensor data and sensor commands between said sensor means and said workstation means.

2. A tracking system employing global positioning system (GPS) satellites for determining the position of one or more objects to be tracked, the tracking system comprising:

sensor means, mounted on each object, the sensor means being operative for receiving signals provided by a plurality of visible GPS satellites and for computing sensor data comprising selected raw satellite measurements;

workstation means, positioned at a central location that is remotely located with respect to said one or more objects, for periodically receiving and storing the raw satellite measurements computed by said sensor means, for computing therefrom position information relative to the one or more objects, and for displaying the computed position information to an operator at said central location, said workstation means being further operative for periodically providing initialization data in the form of sensor commands to said sensor means to enable said sensor means to acquire and track the plurality of visible GPS satellites, said initialization data comprising initial estimates of the position of each of the one or more objects and a satellite selection table; and a communication link coupling said sensor means and said workstation means to facilitate the transfer of sensor data and sensor commands between said sensor means and said workstation means.

3. A tracking system as in claim 2 wherein said workstation means is further operative for transmitting, over said communication link, said computed position information to a corresponding one of the one or more objects.

4. A tracking system as in claim 1 wherein said workstation means is further operative for transmitting, over said communication link, said computed position information to a corresponding one of the one or more objects.

5. A sensor mounted on each of a multiplicity of objects to be tracked in a tracking system employing global positioning system (GPS) satellites, the sensor comprising:

antenna means for receiving signals from one or more GPS satellites;

RF/IF means for receiving signals from said antenna means and for converting those signals to digital samples, said RF/IF means comprising preamplifier means for receiving and amplifying an L1 radio frequency signal having a nominal carrier frequency of 1575.42 MHz, a reference oscillator operating at a frequency F0, phase locked loop means for generating a single local oscillator signal at a frequency 256F0, mixer means for receiving said L1 radio frequency signal from the preamplifier means, said mixer means being responsive to the local oscillator signal for reducing the signal output of the preamplifier means to an intermediate frequency signal having a frequency of 1575.42−256*F0 MHz, low pass filter means for filtering the intermediate frequency signal provided by said mixer means, and digitizer means for digitizing the filtered intermediate frequency signal provided by said low pass filter means;

digital signal processing (DSP) means coupled to said RF/IF means for converting those digital samples to processed digital signals;

a crystal oscillator coupled to said RF/IF means and to said DSP means for generating a local oscillator signal and providing that local oscillator signal to said RF/IF means and to said DSP means; and microcomputer means coupled to said DSP means for computing, from said signals received from one or more GPS satellites, sensor data comprising selected raw satellite measurements to be transmitted to a remotely located workstation for computation of the position and velocity of the object on which the sensor is mounted.

6. A sensor as in claim 5 wherein said crystal oscillator comprises a temperature compensated crystal oscillator.

7. A sensor as in claim 5 wherein said crystal oscillator comprises a temperature controlled crystal oscillator.

8. A sensor as in claim 5 wherein said digitizer comprises a limiter.

9. A sensor as in claim 5 wherein said DSP means comprises a plurality of individual DSP circuits on a single semiconductor chip, each of said plurality of individual circuits comprising:

a pair of exclusive OR gates for performing code correlation on a signal received from said RF/IF input means and for performing carrier demodulation employed in generating in phase and quadrature signals I and Q;

a pair of up/down counters coupled to said pair of exclusive OR gates for accumulating the in phase and quadrature signals I and Q;

a C/A coder coupled to said pair of exclusive OR gates for generating a coarse acquisition code from a signal indicative of a satellite being tracked;

a code phase numerically controlled oscillator coupled to said C/A coder for indexing said C/A coder;

a carrier numerically controlled oscillator coupled to said pair of exclusive OR gates, for receiving a divided DSP clock signal, and for generating the in phase and quadrature signals I and Q; and memory map interface means coupled to said microcomputer means for receiving the in phase and quadrature signals I and Q and for generating a plurality of control signals therefrom.

10. A sensor as in claim 5 wherein the frequency F0 at which said reference oscillator operates is 6.1539 MHz.

11. A sensor mounted on each of a multiplicity of objects to be tracked in a tracking system employing global positioning system (GPS) satellites, the sensor comprising:

antenna means for receiving signals from one or more GPS satellites;

RF/IF means for receiving signals from said antenna means and for converting those signals to digital samples;

digital signal processing (DSP) means coupled to said RF/IF means for converting those digital samples to processed digital signals, said DSP means comprising a pair of exclusive OR gates for performing code correlation on a signal received from said RF/IF input means and for performing carrier demodulation employed in generating in phase and quadrature signals I and Q, a pair of up/down counters coupled to said pair of exclusive OR gates for accumulating the in phase and quadrature signals I and Q, a C/A coder coupled to said pair of exclusive OR gates for generating a coarse acquisition code from a signal indicative of a satellite being tracked, a code phase numerically controlled oscillator coupled to said C/A coder for indexing said C/A coder, a carrier numerically controlled oscillator coupled to said pair of exclusive OR gates, for receiving a DSP clock signal derived by dividing reference oscillator frequency F0, and for generating the in phase and quadrature signals I and Q, and memory map interface means coupled to said microcomputer means for receiving the in phase and quadrature signals I and Q and for generating a plurality of control signals therefrom;

a crystal oscillator coupled to said RF/IF means and to said DSP means for generating a local oscillator signal and providing that local oscillator signal to said RF/IF means and to said DSP means; and microcomputer means coupled to said DSP means for computing, from said signals received from one or more GPS satellites, sensor data comprising selected raw satellite measurements to be transmitted to a remotely located workstation for computation of the position and velocity of the object on which the sensor is mounted.

12. A sensor as in claim 11 wherein the frequency of said reference oscillator signal F0 is 6.1539 MHz and wherein said DSP clock signal is derived by dividing said reference oscillator signal F0 by 3 to obtain a DSP clock signal whose frequency is 2.01513 MHz.

13. A sensor as in claim 11 wherein said DSP means comprises a plurality of individual DSP circuits on a single semiconductor chip.

14. A sensor as in claim 11 wherein said crystal oscillator comprises a temperature compensated crystal oscillator.

15. A sensor as in claim 11 wherein said crystal oscillator comprises a temperature controlled crystal oscillator.

16. A tracking process employing global positioning system (GPS) satellites for determining the position of each of one or more objects to be tracked, the process comprising:
   mounting a sensor on each object;
   receiving signals at the sensor provided by a plurality of visible GPS satellites;
   computing, in the sensor, sensor data comprising selected raw satellite measurements, from the signals received at the sensor;
   providing a workstation at a central location;
   periodically receiving and storing, at the workstation, the raw satellite measurements computed by the sensor;
   storing a digital map in the workstation, the digital map containing route and altitude aiding information regarding each of the one or more objects, thereby facilitating computation of the position information using only high elevation satellites and when the one or more objects are operating in a high rise urban environment;
   computing, in the workstation, position information relative to each of the one or more objects from the received and stored raw satellite measurements;
   displaying the computed position information to an operator at said central location; and
   periodically transferring initialization data, in the form of sensor commands, from the workstation to the sensor over a communication link to enable the sensor means to acquire and track the plurality of visible GPS satellites.

17. A tracking process as in claim 16, further comprising the step of transmitting, over the communication link, the computed position information to a corresponding one of the one or more objects.

18. A tracking process as in claim 16 wherein the step of displaying comprises displaying the computed position information relative to each of the one or more objects overlayed on a map of a region in which the one or more objects are located.

19. A tracking process as in claim 16 further comprising the step of broadcasting the computed position information of each of the one or more objects to a corresponding one of the one or more objects.

20. A tracking process as in claim 16 wherein the step of computing position information comprises computation of position information in terms of an offset coordinate.

21. A tracking process as in claim 16 wherein the step of computing position information comprises computation of position information with a reference to a point on the digital map.

22. A tracking process as in claim 16 wherein the step of computing position information comprises:
   providing a GPS reference receiver for receiving signals provided by the plurality of visible GPS satellites;
   deriving a satellite visibility table using the GPS reference receiver;
   storing the satellite visibility table in the workstation;
   computing, in the workstation, the position of each visible GPS satellite;
   computing, in the workstation, an estimated pseudo range and corresponding line-of-sight vector to a median position for the plurality of visible satellites in an area of operation of the one or more objects;
   deriving differential corrections from the GPS reference receiver;
   adding the differential corrections to the computed estimated pseudo range to correct for atmospheric effects and errors in the computed position of each visible GPS satellite;
   computing, in the workstation, a least squares transformation matrix, using the computed line-of-sight vectors, for all of the visible GPS satellites;
   computing, in the workstation, one or more measurement residual vectors, including an estimated altitude offset from a median position in the area of operation of the one or more objects; and
   multiplying, in the workstation, the one or more computed measurement residual vectors by the computed least square transformation matrix.

23. A tracking process employing global positioning system (GPS) satellites for determining the position of each of one or more objects to be tracked, the process comprising:
   mounting a sensor on each object;
   receiving signals at the sensor provided by a plurality of visible GPS satellites;
   computing, in the sensor, sensor data comprising selected raw satellite measurements, from the signals received at the sensor;
   providing a workstation at a central location;
   periodically receiving and storing, at the workstation, the raw satellite measurements computed by the sensor;
   computing, in the workstation, position information relative to each of the one or more objects from the received and stored raw satellite measurements;
   displaying the computed position information to an operator at said central location; and
   periodically transferring initialization data, in the form of sensor commands, including initial estimates of the position of each of the one or more objects and a satellite selection table, from the workstation to the sensor over a communication link to enable the sensor means to acquire and track the plurality of visible GPS satellites.

24. A tracking process as in claim 23 wherein the step of displaying comprises displaying the computed position information relative to each of the one or more objects overlayed on a map of a region in which the one or more objects are located.

25. A tracking process as in claim 23 further comprising the step of broadcasting the computed position information of each of the one or more objects to a corresponding one of the one or more objects.

26. A tracking process as in claim 23 herein the step of computing position information comprises computation of position information in terms of an offset coordinate.

27. A tracking process as in claim 23, further comprising the step of transmitting, over the communication link, the computed position information to a corresponding one of the one or more objects.

28. A tracking process as in claim 23 wherein the step of computing position information comprises:
   providing a GPS reference receiver for receiving signals provided by the plurality of visible GPS satellites;
   deriving a satellite visibility table using the GPS reference receiver;
   storing the satellite visibility table in the workstation;
   computing, in the workstation, the position of each visible GPS satellite;
   computing, in the workstation, an estimated pseudo range and corresponding line-of-sight vector to a median position for the plurality of visible satellites in an area of operation of the one or more objects;
   deriving differential corrections from the GPS reference receiver;
   adding the differential corrections to the computed estimated pseudo range to correct for atmospheric effects and errors in the computed position of each visible GPS satellite;
   computing, in the workstation, a least squares transformation matrix, using the computed line-of-sight vectors, for all of the visible GPS satellites;
   computing, in the workstation, one or more measurement residual vectors, including an estimated altitude offset from a median position in the area of operation of the one or more objects; and
   multiplying, in the workstation, the one or more computed measurement residual vectors by the computed least square transformation matrix.

29. A tracking process employing global positioning system (GPS) satellites for determining the position of each of one or more objects to be tracked, the process comprising:
   mounting a sensor on each object;
   receiving signals at the sensor provided by a plurality of visible GPS satellites;
   computing, in the sensor, sensor data comprising selected raw satellite measurements, from the signals received at the sensor;
   providing a workstation at a central location;
   periodically receiving and storing, at the workstation, the raw satellite measurements computed by the sensor;
   computing, in the workstation, position information relative to each of the one or more objects from the received and stored raw satellite measurements;
   displaying the computed position information to an operator at said central location; and
   periodically transferring initialization data, in the form of sensor commands, from the workstation to the sensor over a communication link to enable the sensor means to acquire and track the plurality of visible GPS satellites;
   wherein the step of computing position information comprises:
   providing a GPS reference receiver for receiving signals provided by the plurality of visible GPS satellites;
   deriving a satellite visibility table using the GPS reference receiver;
   storing the satellite visibility table in the workstation;
   computing, in the workstation, the position of each visible GPS satellite;
   computing, in the workstation, an estimated pseudo range and corresponding line-of-sight vector to a median position for the plurality of visible satellites in an area of operation of the one or more objects;
   deriving differential corrections from the GPS reference receiver;
   adding the differential corrections to the computed estimated pseudo range to correct for atmospheric effects and errors in the computed position of each visible GPS satellite;
   computing, in the workstation, a least squares transformation matrix, using the computed line-of-sight vectors, for all of the visible GPS satellites;
   computing, in the workstation, one or more measurement residual vectors, including an estimated altitude offset from a median position in the area of operation of the one or more objects; and
   multiplying, in the workstation, the one or more computed measurement residual vectors by the computed least square transformation matrix.

30. A tracking process as in claim 29 wherein the step of displaying comprises displaying the computed position information relative to each of the one or more objects overlayed on a map of a region in which the one or more objects are located.

31. A tracking process as in claim 29 further comprising the step of broadcasting the computed position information of each of the one or more objects to a corresponding one of the one or more objects.

32. A tracking process as in claim 29 wherein the step of computing position information comprises computation of position information in terms of an offset coordinate.

* * * * *